(No Model.)  2 Sheets—Sheet 1.
F. G. McCOLM.
LOCKING DEVICE FOR SHAFTS.
No. 448,725.  Patented Mar. 24, 1891.
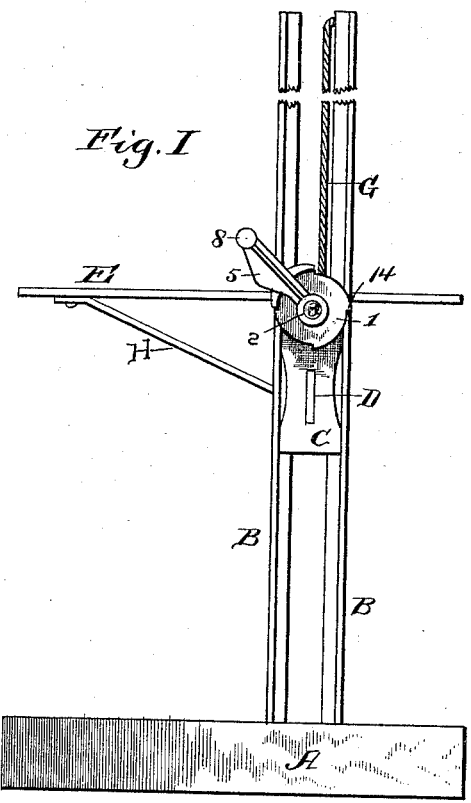
Fig. I.
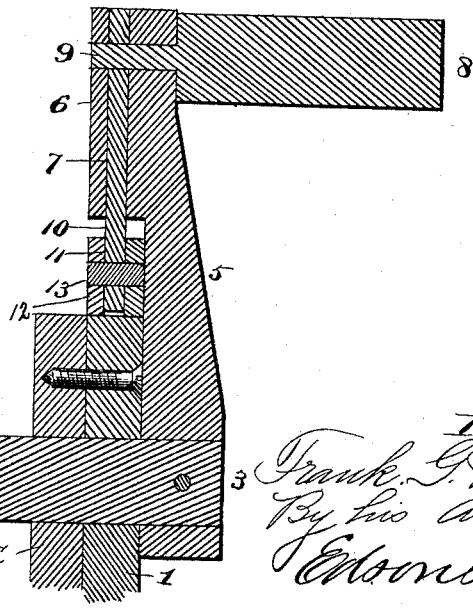
Fig. II.
Witnesses:  Inventor.
Frank G. McColm
By his Attorneys
Edson Bros.

(No Model.) 2 Sheets—Sheet 2.
F. G. McCOLM.
LOCKING DEVICE FOR SHAFTS.
No. 448,725. Patented Mar. 24, 1891.
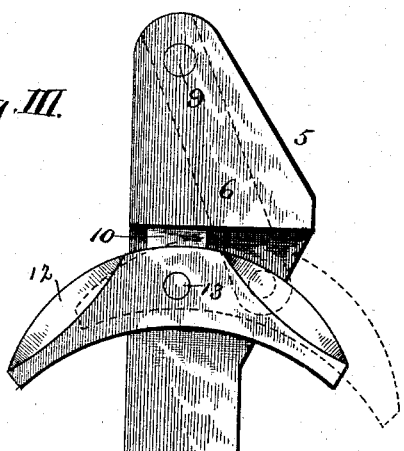
Fig. III.
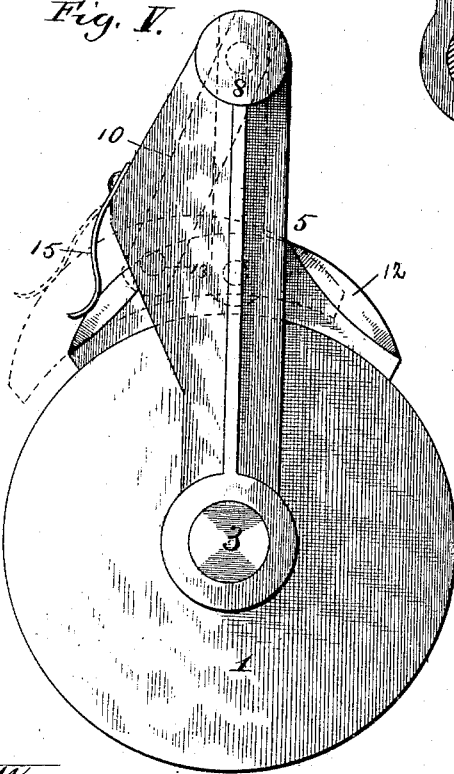
Fig. V.
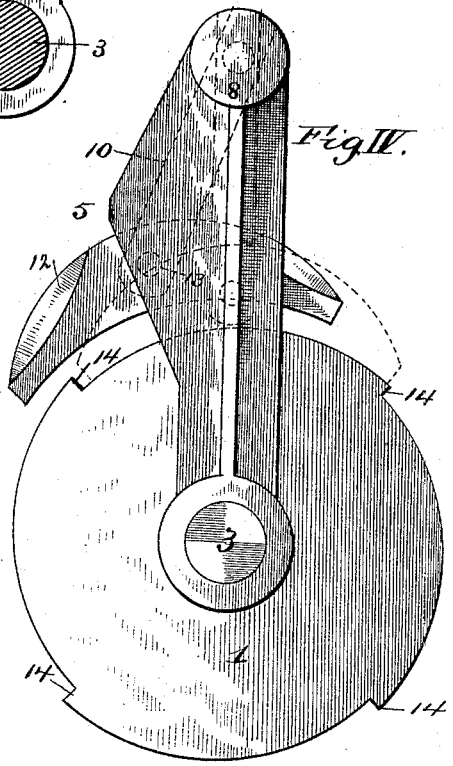
Fig. IV.
Witnesses:
H. B. McGinn
Arthur L. Bryant
Inventor:
Frank G. McColm
By his Attorneys,
Edson Bros.

UNITED STATES PATENT OFFICE.

FRANK G. McCOLM, OF FORESTBURG, SOUTH DAKOTA.

LOCKING DEVICE FOR SHAFTS.

SPECIFICATION forming part of Letters Patent No. 448,725, dated March 24, 1891.

Application filed August 28, 1890. Serial No. 363,340. (No model.)

*To all whom it may concern:*

Be it known that I, FRANK G. MCCOLM, a citizen of the United States, and a resident of Forestburg, in the county of Sanborn and State of South Dakota, have invented certain new and useful Improvements in Locking Devices for Shafts; and I do hereby declare the following to be a full, clear, and exact description of the invention, such as will enable others skilled in the art to which it appertains to make and use the same.

My invention relates to a locking contrivance especially adapted for camera-stands; and the invention has for its object to provide a simple and effective means for operating the camera-adjusting shaft and holding or locking said shaft and the camera in their adjusted positions.

With this end in view my invention consists in the combination, with the shaft employed for operating the elevating rack or standard of a camera, of a crank-arm for rotating said shaft and a locking device for holding the shaft against rotation, and thus maintaining the camera at any desired elevation, said locking mechanism being actuated by the same handle that turns the operating-shaft.

My invention further consists in the peculiar construction and arrangement of parts, as will be hereinafter fully described and claimed.

In order that others may understand my invention, I have illustrated the same in the accompanying drawings, in which—

Figure I is a side elevation of a portion of a camera-stand with my improvements attached thereto, showing the detent clear of the locking disk or plate. Fig. II is a longitudinal sectional view through the crank-arm and parts attached thereto. Fig. III is a detail plan view of the crank and shaft for operating the elevating rod or shaft. Fig. IV is a side view of my improved locking device. Fig. V is a view of a modified form of my invention.

Like numerals of reference denote corresponding parts in all the figures of the drawings, referring to which—

1 designates a disk or plate rigidly attached in any suitable manner to a camera-stand, and said disk or plate is provided with a central aperture 2, through which a short horizontal shaft 3 passes, said shaft being suitably connected to the rack or standard (not shown) of a camera-stand to raise and lower the camera in the ordinary manner.

To the outer end of the shaft 3 is rigidly secured one end of an arm or crank 5, the other or outer end of which is provided with an enlarged portion 6. In this enlarged portion 6 of the crank-arm 5 is formed a slot or chamber 7, which extends longitudinally through said enlarged portion and opens at both ends through the same.

Near the outer end of the arm or crank 5 is attached a handle 8, by means of which the crank 5 and shaft 3 are adapted to be rotated. The pivot 9 of the handle 8 passes through the slot or chamber 7, near the outer end thereof, and at that portion of its length between or within the walls of the slot or chamber the pivot 9 is made rectangular, square, or other polygonal form in cross-section. On the said pivot 9, within the slot or chamber 7, is rigidly secured one end of a swinging arm 10, which arm extends through the slot or chamber 7, and is fitted at its other end in a slot 11, formed in a dog or detent 12, which is centrally pivoted to said swinging arm by a pivot 13.

The operation of my invention is very simple, and may be briefly stated as follows: When it is desired to raise or lower the camera, (the parts being in the position shown in Fig. I,) it is only necessary to turn the handle 8, and thus rotate the crank-arm 5 and shaft 3, which shaft operates to lift the camera in the usual manner. When the camera has reached the desired elevation, the operator simply turns or rocks the handle 8 slightly without rotating the crank, which thus causes the swinging arm 10 to rock or turn on its pivot, and the dog or detent at the other end of said swinging arm is forced against the periphery of the disk or plate 1 and the further rotation of the shaft 3 is prevented. When it is desired to change the elevation of the camera, the operator simply turns the handle 8 slightly on its pivot and raises one end of the dog or detent, so that the crank-arm and shaft can be revolved in the desired direction, and the elevating standard or rack of the camera is secured in its adjusted position in the manner heretofore described.

In Figs. I and IV of the drawings I have illustrated the disk or plate 1 as provided on its periphery with a series of notches or teeth 14, arranged at regular intervals thereon, and against any one of which teeth the end of the dog or detent is adapted to be forced. I do not, however, confine myself strictly to this form of the disk or plate, as I am aware that other forms may be used with equally good effect.

In Fig. V I have illustrated a modified form of my invention, in which the disk or plate is provided with a smooth periphery. In this modified form, in case the disk is of less diameter than the greatest diameter of the disk shown in Fig. IV, the swinging arm 10 is made longer, so that the dog or detent carried thereby will come in contact with the periphery of the disk before said arm 10 comes in contact with the wall of the slot or chamber 7. In this form of the locking device I further provide a flat spring 15, the free end of which bears against the end of the dog or detent to hold it more firmly against the periphery of the fixed disk or plate.

Although I have shown and described my invention as especially adapted for use in locking the operating-shaft of a photographer's camera, yet I do not strictly confine myself to the use of my invention in this particular connection, as I am aware that the same can be used with equally good results in other devices where it is desired to operate a shaft by hand and lock the shaft against rotation, for which purposes my invention is especially desirable, as the locking of the shaft, as well as the rotation thereof, can be effected by the same contrivances.

In Fig. I of the drawings I have illustrated my improved locking device applied to a camera-stand, which consists of a base A, to which is secured a pair of uprights B, and between these uprights is snugly fitted an adjustable piece C. On the outer face of the side piece C, near the upper end thereof, is secured a disk 1, and through this disk passes a shaft 3, provided at one end with a crank or handle, and the locking devices, hereinbefore described, for rotating and locking the shaft.

In practice two pairs of uprights are employed, although only one pair is shown in the drawings, and between each pair is fitted a piece C, said pieces being connected by a cross-bar D, and the shaft 3 extends through from one piece C to the other and on it rests a table E, adapted to carry a camera. One end of this table is connected with the cross-bar D by a frame H.

To the upper end of each pair of uprights B is secured one end of a suspending cord or chain G, and the other ends of said cords or chains are secured to the shaft 3, so that as said shaft is revolved the cords or chains are wound around it, thus lifting the adjustable frame and tilting the table E.

Having thus fully described my invention, what I claim as new, and desire to secure by Letters Patent, is—

1. The combination, with an operating-shaft, of a fixed disk or plate, a crank-arm rigid with the shaft, and means, substantially as described, adapted to engage the disk for locking the crank-arm against rotation, as and for the purpose described.

2. The combination, with an operating-shaft, of a fixed disk or plate, a crank-arm rigid with said shaft and having the slotted portion at its outer end, a handle for rotating the crank-arm, and a pivoted dog or detent carried by the crank and connected with the handle and adapted to contact with the periphery of said disk or plate, as and for the purpose described.

3. The combination, with the operating-shaft, of a fixed disk or plate, a crank-arm having a slotted portion, a handle pivoted to the crank at said slotted portion thereof, a dog or detent, and connections intermediate of the handle and detent for operating said detent to release and force the same upon the periphery of the fixed plate, for the purpose described, substantially as set forth.

4. The combination, with an operating-shaft, of a crank-arm rigid with the shaft, a locking device carried by said crank-arm, and a rocking handle connected to the crank-arm and to the locking device, for the purpose described, substantially as set forth.

5. The combination, with an operating-shaft, of a toothed disk or plate, a crank-arm rigid with the shaft, a rocking handle pivoted to the crank-arm, a swinging arm rigid with the rocking handle, and a detent pivoted centrally to the swinging arm, substantially as described.

In testimony whereof I affix my signature in presence of two witnesses.

FRANK G. McCOLM.

Witnesses:
HENRY DROWN,
GEORGE T. SNYDER.